United States Patent [19]

Erickson

[11] 4,213,447
[45] Jul. 22, 1980

[54] AIR DISTRIBUTION CONTROL SYSTEM

[76] Inventor: Donald P. Erickson, 6443 Reed Ct., Denver, Colo. 80003

[21] Appl. No.: 911,798

[22] Filed: Jun. 2, 1978

[51] Int. Cl.² ............................................. F24J 3/02
[52] U.S. Cl. ................................. 126/429; 126/430; 236/49; 98/38 B
[58] Field of Search ............... 126/270, 400, 428–430; 236/49; 98/38 B, 38 C, 38 D, 31, 40 R; 237/1 A

[56] References Cited

U.S. PATENT DOCUMENTS

| | | | |
|---|---|---|---|
| 2,680,565 | 6/1954 | Lof | 237/1 A |
| 2,813,474 | 11/1957 | Kurth et al. | 98/38 B |
| 3,318,225 | 5/1967 | May | 98/38 B |
| 3,376,916 | 4/1968 | Gressett | 98/38 B |
| 3,981,445 | 9/1976 | Custer | 126/270 |
| 3,994,276 | 11/1976 | Pulver | 126/270 |
| 3,997,108 | 12/1976 | Mason | 126/270 |
| 4,029,258 | 6/1977 | Groth | 237/1 A |
| 4,098,262 | 7/1978 | Peters | 237/1 A |
| 4,121,764 | 10/1978 | Hope et al. | 126/270 |
| 4,137,898 | 2/1979 | Koizumi et al. | 237/1 A |

*Primary Examiner*—Henry C. Yuen
*Attorney, Agent, or Firm*—John E. Reilly

[57] ABSTRACT

An air distribution control system is specifically adaptable for use with a solar heating installation and utilizes a common plenum having a plurality of damper controlled openings which can be opened and closed in different combinations to regulate the flow of air under pressure to and from a heat storage source and solar collection in supplying forced air to a room or other space to be heated.

14 Claims, 6 Drawing Figures

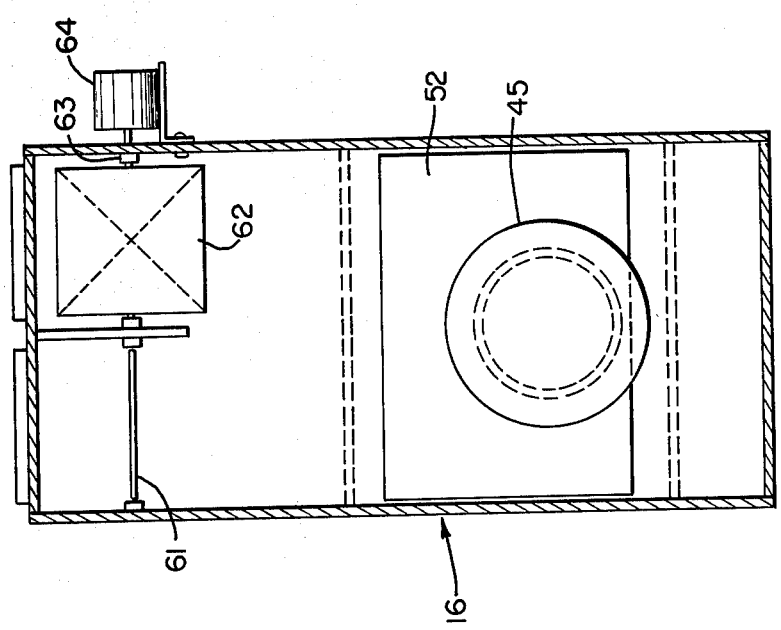
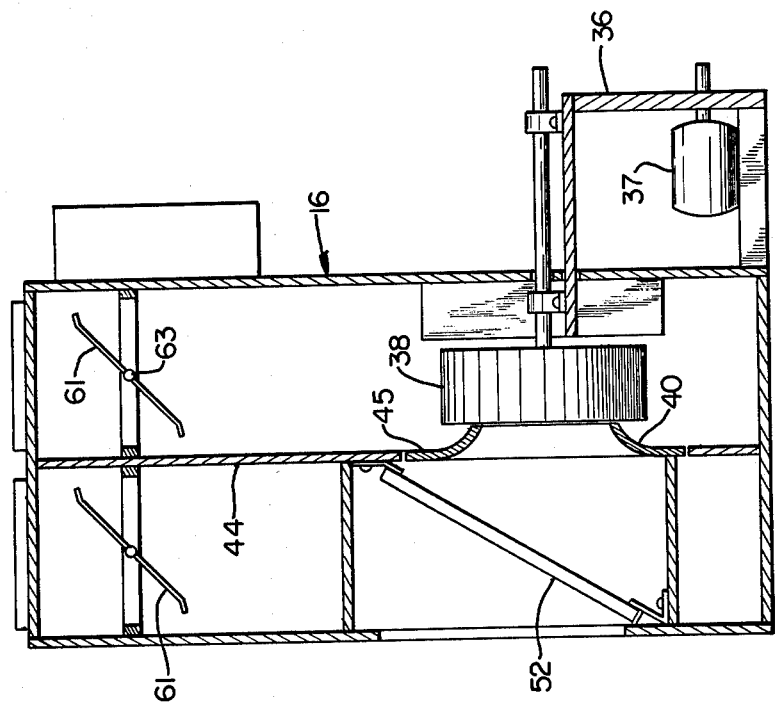

AIR DISTRIBUTION CONTROL SYSTEM

This invention relates to a novel and improved air distribution control system and more particularly relates to a novel and improved method and means for distribution of air in a solar heating installation.

BACKGROUND OF THE INVENTION

Forced air systems for commercial and residential buildings are typified by having a series of ducts which run from the source of hot air such as the furnace to the various spaces to be heated, each duct containing a separate damper control or vane to regulate the relative amount of air passed through each duct. In solar heating units which employ forced air as the heat supply medium, additional considerations are involved in that air or other fluid must be distributed across a solar collector which is located externally of the building and returned either to a heat storage area or directly to a space to be heated, depending upon whether there is any immediate demand for the supply of hot air to the space. During periods when there is no heat available from the solar collector, however, the storage area must provide heat to the space when required; or if heat is not available from the space or from the solar collector an auxiliary heat source must be available to supply the necessary heat to the space.

In the past due to variable demand in heat and fluctuations in the amount of heat available either from the solar collector or the storage area, rather elaborate ducting systems have been provided by requiring separate damper controls, thermostats and blowers for maintaining the temperature at the desired level in the space to be heated. Representative of such systems are those disclosed in the patents to Groth U.S. Pat. No. 4,029,258, Pulver U.S. Pat. No. 3,994,276, Lof U.S. Pat. No. 2,680,565 and Gay U.S. Pat. No. 2,559,871. Still another patent of interest is to Mason U.S. Pat. No. 3,997,108 which attempts to consolidate the duct system so as to be capable of moving air either from the solar collector to the storage area or directly to the space; or directly from the storage area to the space all under the influence of a single blower. However, the system requires utilization of dampers in series under independent damper drives which are regulated by thermostats to determine the relative amount of air drawn from the solar collector or from the heat storage area to the space or area to be heated.

SUMMARY OF THE INVENTION

It is therefore an object of the present invention to provide for a novel and improved air distribution system which will greatly simplify and consolidate the conduits and controls required for movement of air from one or more sources of hot air into a space to be heated as well as between different sources of hot air in an efficient and reliable manner.

It is another object of the present invention to provide for a novel air distribution control system for a solar heating installation which employs a common plenum and associated damper controls which are closely coordinated to regulate the delivery of air from different hot air sources into a space to be heated and in such a way as to minimize the ducting and independently controlled dampers required for efficiently supplying heat to the space.

It is an additional object of the present invention to provide for a novel and improved solar heating installation which is versatile, compact, requires a minimum number of parts and controls in efficiently heating a space.

The present invention may be best exemplified by describing its use in association with a solar energy installation which is characterized by having a solar collector, a storage area for hot air recovered from the solar collector and a space or room to be heated. In accordance with the present invention, a common plenum is partitioned into a pair of chambers with a blower or other air circulating means having a positive side communicating with one of the chambers and a negative side communicating with the other of the chambers. Ducts extend from the solar collector and from the hot air storage area for communication with the negative side of the plenum; and another pair of ducts extend from the positive side of the chamber for communication with the heat storage area and the space to be heated, respectively. Preferably, all of the ducts are brought into one wall of the plenum, and damper control members are arranged across that wall, there being one at the juncture of each duct with the wall of the chamber. Further, opening and closing of the dampers are so correlated that only one of the dampers for each pair of ducts is open and the other of each pair is closed at any given time; and a common damper control may be employed to regulate opening and closing of each pair of ducts on the positive and negative side of the chambers, respectively. Nevertheless circulation of air can be controlled for movement either from the solar collector to the heat storage area or to the space to be heated, or can be controlled for movement of the air from the storage space to the space to be heated and can be further supplemented by an auxiliary heating element in the event that the temperature of the air from the solar collector or the storage area is not sufficient to bring the temperature in the space up to the desired level.

The above and other objects, advantages and features of the present invention will become more readily appreciated and understood from a consideration of the following detailed description of a preferred embodiment when taken together with the accompanying drawings in which:

BRIEF DESCRIPTION OF THE DRAWINGS

FIG. 5 is a sectional view taken along lines 5—5 of FIG. 4D; and

FIG. 6 is a sectional view taken about lines 6—6 of FIG. 4D.

DETAILED DESCRIPTION OF THE PREFERRED EMBODIMENT

Figure 1:
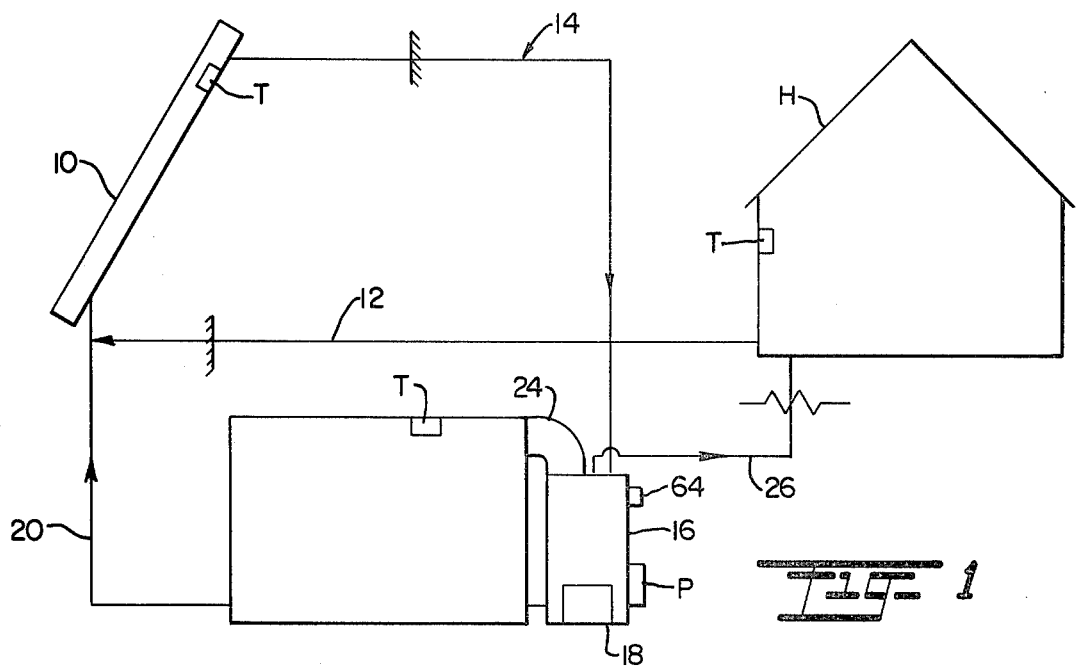
FIG. 1 is a diagrammatic view illustrating the air distribution control system of the present invention employed in association with a solar heating installation.
Figure 2:
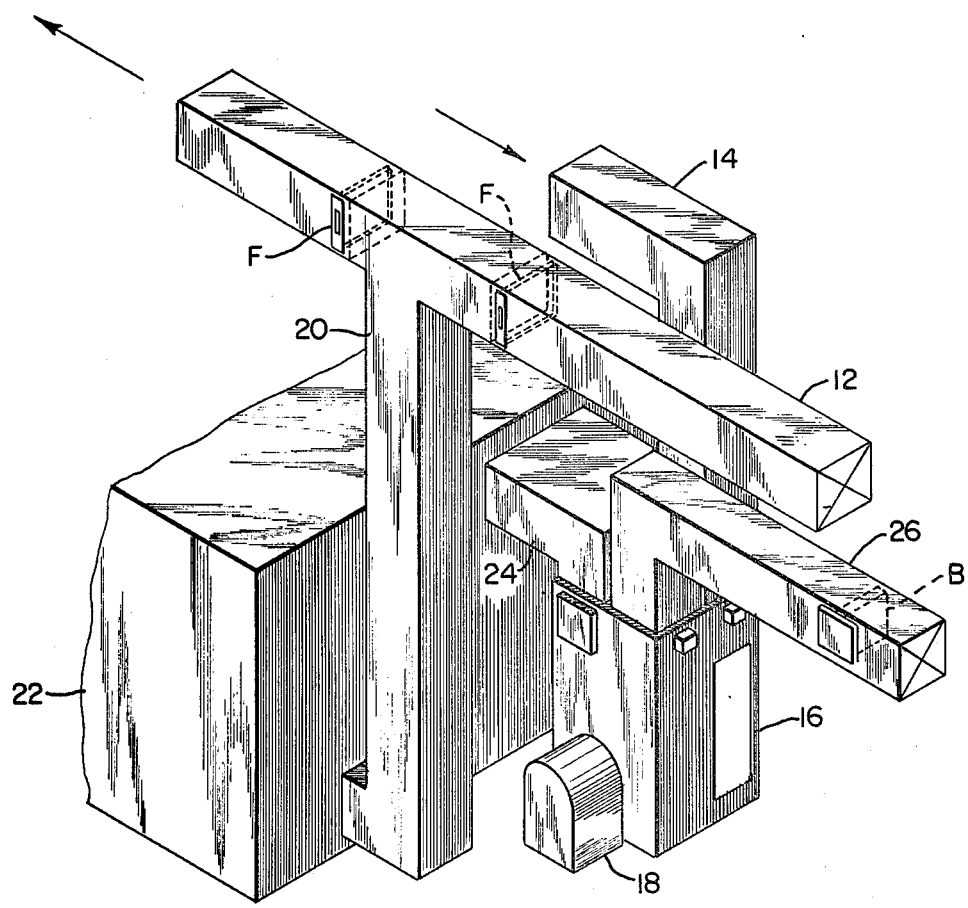
FIG. 2 is a perspective view illustrating in more detail the air distribution control system of the present invention.
Figure 3:
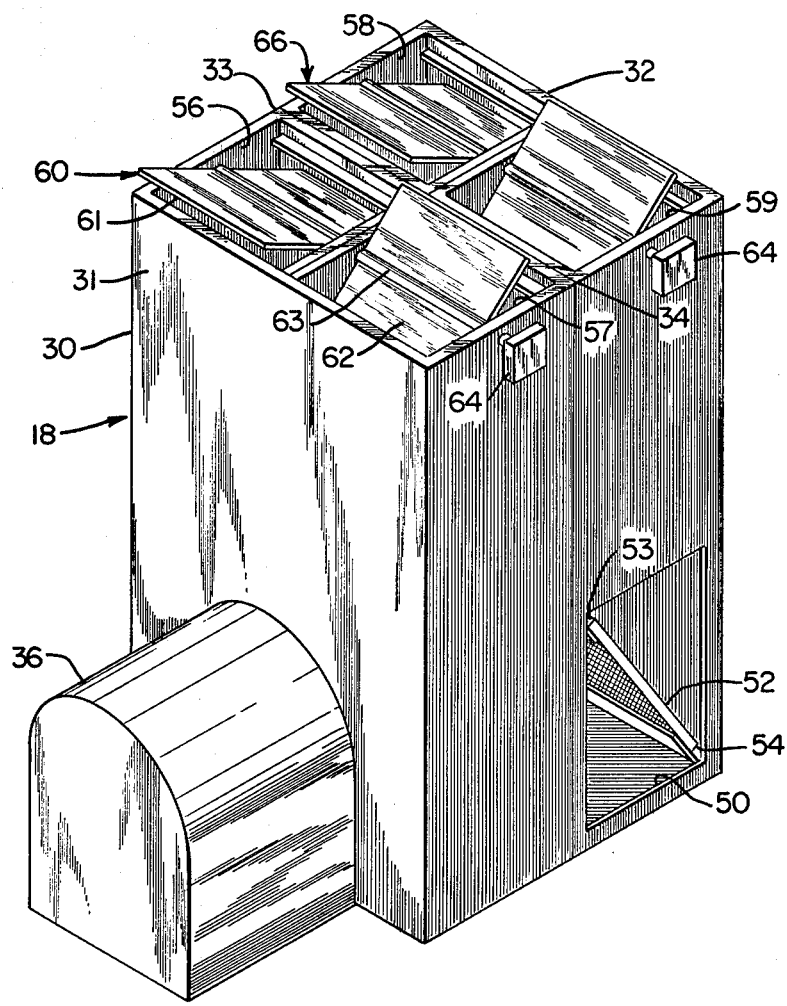
FIG. 3 is a perspective view of a preferred form of plenum employed in the air distribution control system of the present invention.

Referring in more detail to the drawings, there is shown by way of illustrative example in FIGS. 1 and 2 a solar heating installation for a house in which a conventional solar collector panel assembly 10 is represented as being mounted on a pitched roof and is of the type which is adapted to heat air which is delivered through a return air duct 12 from the interior of a house represented at H, the air being passed over the collector panel 10 and drawn through an inlet duct 14 into a plenum 16 which contains a fan or blower in the area designated at 18. Air may also be drawn through a separate duct 20 from a heat storage area 22 and caused to pass over the collector panel 10 then to return to the plenum through the line 14. A common duct represented at 24 serves to deliver air into the storage area 22 or to remove air from the storage area 22 for delivery over line 26 into the space to be heated, as represented by the house H. Additional accessories may be incorporated into the system in accordance with conventional practice including filters represented at F and a back-up heater represented at B in the delivery line from the plenum 16 to the space to be heated.

As shown in more detail in FIGS. 3 to 7, an important feature of the present invention resides in the construction and arrangement of the plenum 16 both alone and in combination with the duct system to achieve most efficient and reliable circulation of air in the space heating system. The plenum 16 comprises a generally rectangular enclosure 30 having opposite end walls 31 and 32 and opposed sidewalls 33 and 34. The end wall 31 includes an opening at its lower end which is covered by a motor housing 36 for the motor drive 37 of a fan or blower represented at 38, the latter projecting through the lower interior of the plenum 16. The plenum is divided into two chambers $C_1$ and $C_2$ by a vertical partition 44 extending midway between and parallel to the opposite end wall panels 31 and 32, and the partition 44 has a lower edge 45 terminating directly above the upper edge of the divergent fan inlet 40 which communicates with and draws air into the fan wheel 38 from the negative chamber C.

The sidewall panel 34 is provided with an access opening 50 to permit removable insertion of a filter represented at 52 and which is positioned at an inclined angle across the front of the inlet 40 with the upper edge 53 of the filter abutting the lower edge 45 of the partition and lower edge 54 of the filter resting against the bottom edge of the end panel 32.

The upper end of the plenum 30 is subdivided into four damper openings which communicate with the ducts leading to and from the solar collector panel assembly 10, rock storage area 22 and the space to be heated represented at H. Specifically duct openings 56 and 57 are arranged on the positive side of the plenum and duct openings 58 and 59 are arranged on the negative side of the plenum; or in other words, air is drawn inwardly through either of the openings 58 and 59 when the fan is in operation and discharged by the fan through either one of the openings 56 and 57 on the positive side of the plenum. In order to control the flow of air through the plenum, first damper control means is disposed across the openings 56 and 57, the damper control means 60 defined by a damper vane 61 adapted to transverse the opening 56 and damper vane 62 adapted to traverse the opening 57. The vanes 61 and 62 are mounted perpendicular or at right angles to one another on a common drive shaft 63 and are caused to rotate about that shaft by a thermostatically controlled damper drive motor 64. Correspondingly, a second damper control means 66 is disposed across the openings 58 and 59 and like elements ments of the damper control means 66 are correspondingly enumerated to that of the damper control means 60.

Figure 4:
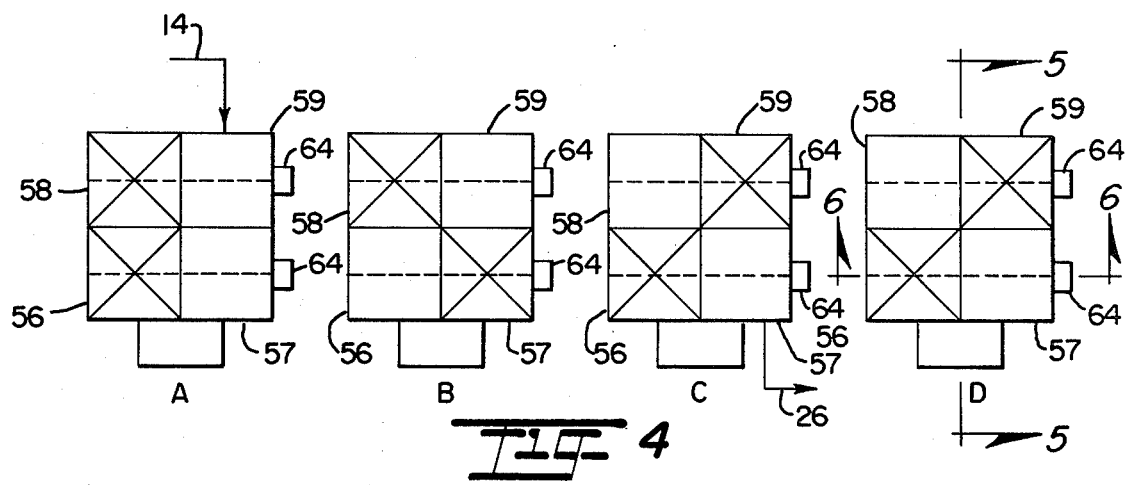
FIGS. 4A, 4B, 4C and 4D schematically illustrate the various different damper positions to regulate movement of air between the various components parts of the installation.

The various modes of operation of the distribution control unit are schematically illustrated in FIG. 4 wherein the closed positions of the dampers are designated with an X and the open positions are designated without an X. Thus in FIG. 4A, openings 57 and 59 are open and openings 56 and 58 are closed. The opening 59 communicates with the duct 14 from the collector panel assembly to draw heated air through the duct and to discharge same through the duct 26 which communicates with opening 57 on the positive side of the plenum for delivery of heated air to the space to be heated. As shown in FIG. 4B, the damper openings 58 and 57 are closed while damper openings 56 and 59 are open, damper opening 56 communicating with the storage area through duct 24 so that heated air from the collector panel assembly is delivered through the duct 14 into chamber $C_1$ and is discharged by the blower through the duct 24 into the storage area 22. In FIG. 4C, damper openings 56 and 59 are closed; and damper openings 57 and 58 are open whereby to draw air from the rock storage area 22 through the common duct 24 into the plenum and to discharge same through the damper opening 57 into duct 26 leading to the space. Finally, in FIG. 4D, damper openings 56 and 59 are closed while damper openings 57 and 48 are open so as to be in the same relationship as illustrated in FIG. 4C. Once again, air is drawn from the storage area 22 for discharge into the space through the duct 26 with the auxiliary or back-up heater represented at B in FIG. 2 being activated to heat the air to bring it up to the desired temperature level for the space in the event that the temperature level in the storage area 22 is not sufficient to heat the space. Of course the auxiliary heat source may be employed with other damper settings such as illustrated in FIG. 4A to supplement the heat already available.

Operation of the system is automated through utilization of thermostats or temperature sensors represented at T and which are located in the space to be heated, the solar collector panel assembly 10 and the storage area 22 and are interconnected with the damper drives 64 associated with each of the damper control means 60 and 66. Utilization of a common plenum greatly simplifies the number of sensors and controls required for efficient operation of the system in that the damper drives 64 are responsive to the differential in temperature between the space to be heated, collector panel assembly 10 and storage area 22 to coordinate the operation of the damper control means. For instance, if the temperature level at the collector panel assembly is higher than that of the storage area and of the space to be heated, and the temperature level in the space drops below the thermostat setting, the damper motors are coordinated to advance the dampers to the position illustrated in FIG. 4A so as to supply heated air directly from the collector panel assembly into the space to be heated. As long as the temperature level at the solar collector panel 10 is greater than the temperature level at the storage area 22 the dampers will remain in the position as illustrated in FIG. 4A, but if the temperature is not brought up to the desired level within a predetermined time, the auxiliary heat source is then turned on to supplement the heat available. However, if the temperature level at the solar collector panel assembly should drop below that of the storage area 22, the damper motors will automatically advance the dampers to the position illustrated in FIG. 4C so as to draw heated air from the storage area and discharge through the duct 26 into the space to be heated. Once again, if the temperature is not increased to the desired level in the space, that air may be supplemented by the auxiliary heat source.

During those time intervals when the temperature level in the space remains above the desired setting and the temperature level at the solar panel is greater than the storage area, air is drawn from the storage area over line 20 across the collector panels and returned into the storage area as long as there is a temperature differential therebetween. Once the storage area is brought up to the level of the collector panel, however, the blower motor is de-energized and the system is inactive until the space to be heated requires additional heat.

In large capacity heating applications, such as, commercial space heating applications, a plurality of plenums may be located to service different zones or areas of the building, each plenum drawing air either from a common heat storage area or having its own storage area for each zone.

In the preferred system of the present invention, a space thermostat is positioned in the area to be heated and temperature sensors are positioned at the collector plate 10 and the storage area 22. Each temperature sensor, for example, may be a Minneapolis Honeywell R-4712A and each is connected to a common electronic sensor or control panel P which senses the temperature differential between the collector and the storage area and transmits electrical signals to each of the damper drives 64. Each damper motor 64 may be a Minneapolis Honeywell M-436A and will, in response to a temperature at the collector greater than that in the storage area activate the blower and advance the damper vanes to a position causing air to be drawn from the collector plate into the storage area 22 until the temperature reaches equilibrium as sensed by the electronic sensor P.

Similarly, when the temperature in the room falls a predetermined number of degrees below the temperature setting, the fan will be turned on and the damper drive advanced to a position opening the damper into the space to be heated. Depending upon whether the temperature at the collector plate or storage area is higher, air will be directed from the higher temperature source into the space to be heated. The thermostat in the space has a second stage so that if it is not brought up to the desired temperature within a predetermined time interval it will activate the auxiliary heater whereby to increase the amount of heat supplied.

The plenum 16 may be modified to pull air from the collector panel assembly into the space or from the storage area into the space; and for instance, would obviate the need for the dampers for openings 56 and 57 leading to the storage area 22 and to the space H. Instead, the air would be directed through a separate return duct, not shown, from the collector panel assembly 10 into storage 22 then supplied from storage 22 into the space H. Thus, one plenum could operate to draw air only from the collector into the space and a separate plenum used to draw air from the collector into storage when the space does not require heating. The latter alternative could be useful in a multi-zone application where one plenum is used to direct air into a storage area and a second is used on the output side of the storage area to direct air into one or more zones.

While the present invention has been described in connection with a preferred embodiment thereof it will be understood that other modifications or variations may be made in the configuration and composition as well as its intended use without departing from the scope of the present invention as defined by the appended claims.

What is claimed is:

1. An air distribution control system adaptable for use in a solar heating installation and the like, wherein there is provided a source of hot air, a heat storage area and a space to be heated, the improvement comprising:
   a plenum partitioned into a plurality of chambers,
   common air circulating means for said system mounted in said plenum having a positive side communicating with at least one of said chambers and a negative side communicating with at least one of the other of said chambers,
   first and second ducts extending between said hot air source and said heat storage area, respectively, and the negative side of said chamber in said plenum, and a third duct extending between the positive side of said chamber in said plenum and the space to be heated,
   temperature sensing means for sensing the temperature of said heat storage area, hot air source and the space to be heated; and
   damper control means associated with said plenum to control the circulation of air between said heat storage area, hot air source and space to be heated in accordance with the relative temperature levels sensed by said temperature sensing means.

2. An air distribution control system according to claim 1, said plenum being partitioned into a pair of chambers, and said air circulating means having its positive side communicating with said one of said chambers for delivery into said heat storage area and said space to be heated.

3. An air distribution control system according to claim 2, said damper control means including damper vane members disposed across said second and third ducts at their juncture with said plenum, and a common damper drive member for said damper vane members disposed across said second and third ducts to correlate the opening and closing of said damper vane members so that only one of said damper vane members is open at any given time for the movement of air through its associated duct from the positive side of said air circulating means.

4. An air distribution system according to claim 1, said second duct characterized by extending between said heat storage area and both the negative and positive sides of said air circulating means, and said damper control means including independently controlled damper vane members extending across the positive and negative sides of said air circulating means, respectively, at their juncture with said second duct whereby to independently regulate the circulation of air into and from said hot air storage area.

5. An air distribution control system according to claim 1, said first, second and third ducts extending into a common wall of said plenum for communication with the positive and negative sides of said air circulating means.

6. An air distribution control system according to claim 5, said first and third ducts arranged in side-by-side relation to one another, and said damper control means including damper vane members disposed across each of said first and third ducts at their juncture with said plenum, and damper drive means for independently controlling the movement of said damper vane members across said first and third ducts between an open and closed position.

7. An air distribution control system according to claim 6, including differential temperature sensing means to sense the differential in temperature between the hot air source and heat storage area.

8. An air distribution control system according to claim 1, said plenum being in the form of an upright, generally rectangular enclosure having a vertical partition dividing said plenum into a pair of chambers, and said air circulating means extending across the lower end of enclosure beneath said partition.

9. An air distribution control system according to claim 8, said enclosure including an upper open end divided into quadrants defining openings for mounting of said damper control means.

10. In a solar space heating system having a solar collector assembly through which air to be heated is circulated, a heat storage area and a space to be heated, the combination comprising:
a common plenum including a divider portion partitioning said plenum into a pair of chambers,
an air circulating fan mounted within said plenum and having its positive side communicating with one chamber and its negative side communicating with the other chamber of said plenum,
a first duct extending from said solar collector assembly into said other chamber for communication with the negative side of said air circulating fan, a second duct extending from said heat storage area into communication with said pair of chambers, and a third duct extending from communication with said other chamber into the space to be heated, and damper control means including damper vane members disposed in each of said respective ducts and each movable between an open and closed position, temperature sensing means for sensing the temperature in said solar collector assembly, heated storage area and the space to be heated, and means responsive to the temperature sensed by said temperature sensing means to selectively control opening and closing of said vane members to regulate the circulation of air between said solar collector assembly, heat storage area and the space to be heated.

11. In a solar space heating system according to claim 10, said second duct having a pair of damper vane members, one of said damper vane members extending across the opening between said first duct and the one chamber and the second damper vane member extending across the opening between said second duct and the other chamber, said damper control means being operative to independently control opening and closing of said damper vane members in said first and second ducts.

12. In a solar space heating system according to claim 10, said plenum being of generally rectangular configuration having a flat top, side and end wall panels, said divider portion extending vertically across said plenum to divide said plenum into a pair of chambers, said air circulating fan extending through the lower end of said panel to draw air from one chamber and discharge the air under pressure through the other of said chambers.

13. In a solar space heating system according to claim 10, said damper control means including a pair of damper vane members disposed in said second duct being independently movable between open and closed positions by said damper control means to regulate circulation of air to and from said heat storage area.

14. In a solar space heating system according to claim 13, one of said damper vane members for said second duct regulating the circulation of air from said solar collector assembly into said heat storage area.

* * * * *